(12) United States Patent
Adzima et al.

(10) Patent No.: US 7,465,764 B2
(45) Date of Patent: *Dec. 16, 2008

(54) EPOXY SIZING COMPOSITION FOR FILAMENT WINDING

(75) Inventors: Leonard J. Adzima, Pickerington, OH (US); William G. Hager, Westerville, OH (US); Kevin Guigley, Granville, OH (US); David D. Hokens, Pataskala, OH (US); Jeff L. Antle, Canyon, TX (US); John R. Green, Alexandria, OH (US); Teresa Wagner, Granville, OH (US)

(73) Assignee: OCV Intellectual Captial, LLC DE (US)

( * ) Notice: Subject to any disclaimer, the term of this patent is extended or adjusted under 35 U.S.C. 154(b) by 348 days.

This patent is subject to a terminal disclaimer.

(21) Appl. No.: 10/872,103

(22) Filed: Jun. 18, 2004

(65) Prior Publication Data

US 2005/0279140 A1 Dec. 22, 2005

(51) Int. Cl.
*C08G 67/02* (2006.01)
(52) U.S. Cl. .................. 524/612; 106/287.22
(58) Field of Classification Search ............... 524/612; 106/287.22
See application file for complete search history.

(56) References Cited

U.S. PATENT DOCUMENTS

| | | | |
|---|---|---|---|
| 3,032,439 A | 5/1962 | Müller et al. | |
| 3,262,078 A * | 7/1966 | Foerster | 336/67 |
| 3,317,369 A | 5/1967 | Clark et al. | |
| 3,445,427 A | 5/1969 | Larchar et al. | |
| 4,095,010 A | 6/1978 | Zellar et al. | |
| 4,104,434 A | 8/1978 | Johnson | |
| 4,107,118 A | 8/1978 | McCoy | |
| 4,140,833 A | 2/1979 | McCoy | |
| 4,305,742 A | 12/1981 | Barch et al. | |
| 4,338,234 A | 7/1982 | Moore et al. | |
| 4,394,418 A | 7/1983 | Temple | |
| 4,448,910 A | 5/1984 | Haines et al. | |
| 4,448,911 A | 5/1984 | Haines et al. | |
| 4,656,084 A | 4/1987 | McCoy et al. | |
| 4,933,381 A | 6/1990 | Hager | |
| 5,038,555 A | 8/1991 | Wu et al. | |
| 5,262,236 A | 11/1993 | Brannon | |
| 5,340,903 A | 8/1994 | Tetart et al. | |
| 5,840,370 A | 11/1998 | Woodside et al. | |
| 5,916,679 A | 6/1999 | Woodside et al. | |
| 5,955,195 A | 9/1999 | Moireau | |
| 6,005,026 A | 12/1999 | Piret et al. | |
| 6,025,073 A | 2/2000 | Piret | |
| 6,187,435 B1 * | 2/2001 | Moireau et al. | 428/378 |
| 6,270,897 B1 | 8/2001 | Flautt et al. | |
| 6,281,450 B1 * | 8/2001 | Urasaki et al. | 174/261 |
| 6,461,735 B1 | 10/2002 | Furuya et al. | |
| 6,514,612 B1 | 2/2003 | Moireau et al. | |
| 6,720,080 B2 | 4/2004 | Murari et al. | |
| 2002/0051888 A1 | 5/2002 | Murari et al. | |

FOREIGN PATENT DOCUMENTS

WO  WO 93/06055  4/1993

\* cited by examiner

*Primary Examiner*—Kuo-Liang Peng
(74) *Attorney, Agent, or Firm*—James J. Dottavio

(57) ABSTRACT

A sizing composition containing an epoxy resin emulsion, one or more coupling agents, a cationic lubricant, and an acid. The epoxy resin emulsion includes a low molecular weight epoxy and one or more surfactants. The epoxy resin has an epoxy equivalent weight of from 175-225, preferably from 175-190. Optionally, the sizing composition may also contain a non-ionic lubricant, a polyurethane film former, and/or an antistatic agent. The sizing composition may be used to size glass fibers used in filament winding applications to form reinforced composite articles with improved mechanical properties, wet tensile properties, improved resistance to cracking, and improved processing characteristics.

28 Claims, No Drawings

EPOXY SIZING COMPOSITION FOR FILAMENT WINDING

TECHNICAL FIELD AND INDUSTRIAL APPLICABILITY OF THE INVENTION

The present invention relates generally to size compositions for glass fibers, and more particularly, to size compositions containing an epoxy resin emulsion that includes a low epoxy equivalent weight epoxy resin for sizing glass fibers used in a filament winding application. A composite article formed from fibers sized with the sizing composition is also provided.

BACKGROUND OF THE INVENTION

Glass fibers are useful in a variety of technologies. For example, glass fibers are commonly used as reinforcements in polymer matrices to form glass fiber rein forced plastics or composites because they provide dimensional stability as they do not shrink or stretch in response to changing atmospheric conditions. In addition, glass fibers have high tensile strength, heat resistance, moisture resistance, and high thermal conductivity.

Typically, glass fibers are formed by attenuating streams of a molten glass material from a bushing or orifice. The molten glass may be attenuated by a winder which collects gathered filaments into a package or by rollers which pull the fibers before they are collected and chopped. An aqueous sizing composition is typically applied to the fibers after they are drawn from the bushing. Once the fibers are treated with the sizing composition, they may be cried in a package or chopped strand form. Drying the fibers evaporates the liquid medium and deposits the size as a residue lightly coating the surface of the glass fiber.

Conventional sizing compositions typically contain one or one film forming polymeric or resinous components, glass-resin coupling agents, and one or more lubricants dissolved or dispersed in a liquid medium. The film forming component of the size composition is desirably selected to be compatible with the matrix resin or resins in which the glass fibers are to be embedded. Epoxy resins and polyurethanes have been used as film forming components in size compositions. Epoxy resins are typically utilized where the fibers are to be used for reinforcing articles made from epoxy resins or vinyl esters of epoxy resins, such as by impregnating continuous multifilament glass fiber strands with a curable resin composition, winding the glass fiber strands about a suitable form, and then curing the matrix resin to produce a glass fiber rein forced article Such as a pipe or tank.

U.S. Pat. No. 4,104,434 to Johnson describes a sizing composition that contains a water emulsifiable resin system such as an epoxy resin, an aliphatic monocarboxylic acid, and an aliphatic polycarboxylic acid.

U.S. Pat. No. 4,107,118 to McCoy describes a glass sizing composition that contains an epoxy resin emulsion, a polyvinylpyrrolidone, and a polyethylene glycol ester monooleate. The patentee asserts that the sizing composition is particularly suitable for use in epoxy filament winding.

U.S. Pat. No. 4,140,833 to McCoy discloses a glass sizing composition that includes an epoxy resin emulsion, a polyvinylpyrrolidone, α-metthacryloxypropyltriethoxysilane, and a polyethylene glycol ester monostearate. The patentee asserts that the sizing composition is particularly suitable for continuous pultrusion.

U.S. Pat. No. 4,305,742 to Barch et al. discloses a sizing composition for treating glass fibers that includes a phenolic epoxy resin, the reaction product of a partial ester of polycarboxylic acid that contains one or more unesterified carboxyl groups with a compound containing more than one epoxy group, a lubricant, emulsifiers or wetting agents, one or more silane coupling agents, and water.

U.S. Pat. No. 4,394,418 to Temple describes an aqueous sizing composition that includes a polyvinyl acetate silane copolymer, an epoxy polymer, one or more lubricants, an organosilane coupling agent, one or more non-ionic surfactants, a hydrocarbon acid, and water. The organosilane coupling agent may be an amino-organosilane coupling agent, a lubricant modified aminosilane coupling agent, an epoxy containing silane coupling agent, or a mixture of two or more of these coupling, agents. Optionally, the sizing composition may also include a polyethylene-containing polymer, and/or a wax.

U.S. Pat. No. 4,448,910 to Haines et al. discloses an aqueous sizing composition for glass fibers that contains an emulsified epoxy resin, a lubricant, and 3-chloropropyltrimethoxysilane.

U.S. Pat. No. 4,448,911 to Haines et al. describes an aqueous sizing composition for glass fibers that has an emulsified epoxy resin as the film former, an emulsified mineral oil as the lubricant, glycidoxyalkyl and/or haloalkylsilanes as coupling agents, an amide antistatic agent, and polyvinlylpyrrolidone.

U.S. Pat. No. 4,656,084 to McCoy el al. discloses all aqueous sizing composition for glass fibers that contains epoxy- and methacrylyl-functional organosilanes, a fiber forming polymer such as an epoxy resin, a lubricant, and a pH regulator. McCoy el al. teach that the sizing composition is particularly suitable for glass fiber reinforcements for filament winding and pultrusion applications.

U.S. Pat. No. 4,933,381 to Hager discloses a size composition for sizing small diameter glass fibers. The sizing composition includes an epoxy film former resin, a non-ionic lubricant, a cationic lubricant, at least one organosilane coupling agent, at least one volatile or nonvolatile acid, and water.

U.S. Pat. No. 5,038,555 to Wu et al. discloses a size composition that includes an epoxy as the film former, at least one emulsifying agent, at least one fiber lubricant, at least one organofunctional metallic coupling agent, polyvinylpyrrolidone, a water dispersible or emulsifiable polyethylene, and water.

U.S. Pat. No. 5,262,236 to Brach et al. describes an aqueous size composition for glass fibers that includes an epoxy resin, a coupling agent, and crystalline pentaerythritol. Brannon asserts that the sizing composition is particularly suitable for glass fiber reinforcements for filament winding and pultrusion applications.

U.S. Pat. No. 6,270,897 to Flautt et al. discloses a Sizing composition that contains a combination of at least one diol organosilane and at least one triol organosilane. The sizing composition may also contain film-forming polymeric materials such as epoxy resins and lubricants.

The sizing composition is applied to the fibers to reduce interfilament abrasion and breakage during subsequent processing and to improve the compatibility of the fibers with the matrix resin that is to be reinforced. In addition to improving the processability of the fiber and the fiber-polymer coupling, the sizing composition should also enhance the physical properties of the composite article formed from the reinforced fiber. Accordingly, in view of the dual role of the sizing compositions in improving the processability of the fibers while improving the physical properties of the resulting composite and the wide variety of polymeric materials that can be reinforced with glass fibers, a continuing need exists in the art for specifically tailored sizing corn positions that provide enhanced physical properties and processing characteristics to reinforced composite articles.

SUMMARY OF THE INVENTION

It is all object of the present invention to provide a sizing composition for reinforcing fibers Such as glass fibers, carbon fibers, and synthetic polymer fibers. The sizing composition includes an epoxy resin emulsion, at least one coupling agent, a cationic lubricant, and an acid. In addition, the sizing composition may include a non-ionic lubricant, an epoxy/polyurethane or polyurethane film former, and/or an antistatic agent. The epoxy resin emulsion contains an epoxy resin that has an epoxy equivalent weight of from 175-225 and at least one surfactant. In at least one exemplary embodiment, the epoxy resin has an epoxy equivalent weight of from 175-190. Although the coupling agent may be any silane coupling agent, an epoxy silane coupling agent is preferred. The sizing composition contains a trace amount of a weak acid such as acetic acid, formic acid, succinic acid, citric acid and/or boric acid to hydrolyze the silane in the coupling agent without prematurely opening the epoxy groups. As an alternative to the addition of a weak acid, the size composition may include a mixture of a weak acid and a borate salt. The sizing composition is advantageously employed to coat fibers used in filament winding applications.

It is another object of the present invention to provide a composite article that is formed of a plurality of glass fibers sized with a sizing composition that includes an epoxy resin emulsion, at least one coupling agent, a cationic lubricant, and an acid as described above. The reinforced composite product made from fibers sized with the sizing composition demonstrate improved physical properties such as improved wet mechanical properties, improved strength, and superior processing characteristics such as faster impregnation of a glass strand by the epoxy resin, a low level of broken filaments, and a smoother surface of the pipe.

It is a further object of the present invention to provide a method of forming a composite article that includes applying a sizing composition that includes an epoxy resin emulsion, at least one coupling agent, a cationic lubricant, and an acid as described above to glass fibers, winding the sized glass fibers around a mandrel, and heating the glass fibers to cure the sizing composition and form the composite part.

It is an advantage of the sizing composition that the low molecular weight epoxy resin emulsions present in the size are in a liquid form that reduces or eliminates the need for an organic solvent in the sizing composition. The reduction of organic solvents may reduce the amount of volatile organic compounds (VOC's) that may be emitted, thereby creating a safer, more environmentally friendly workplace.

It is another advantage of the sizing composition that composite articles formed from fibers sized with the sizing composition demonstrate improved wet tensile strength performance, improved cyclic and static fatigue, and improved resistance to cracking. Improved pipe cyclic and static fatigue may permit a pipe manufacturer to reduce the thickness of the pipe wall in a composite part sized with the inventive sizing composition and achieve an improved level of leak resistance in the pipe. In addition, a thinner pipe wall results in a reduction in the pipe's overall weight and a reduction in materials used to form the pipe, thereby reducing manufacturing costs.

The foregoing and other objects, features, and advantages of the invention will appear more fully hereinafter from a consideration of the detailed description that follows.

DETAILED DESCRIPTION AND PREFERRED EMBODIMENTS OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. It is to be noted that the phrases "size composition", "sizing composition", and "size" are used interchangeably herein.

The present invention relates to improved sizing compositions for fibers that may be advantageously used in filament winding processes. The sizing composition includes an epoxy film former, at least one coupling agent, a cationic lubricant, and an acid. In addition, the sizing composition may also contain a non-ionic lubricant, a polyurethane or epoxy/polyurethane film former, and/or an antistatic agent.

The film forming polymer component of the sizing composition may be any suitable polymer that can be dispersed or dissolved into an aqueous medium and which will coalesce to form a film when the sizing composition has been dried. The film former functions to protect the fibers from damage during processing and imparts compatibility of the fibers with the matrix resin. Thus, the film former should be chosen to have compatibility with the matrix resin in which the sized fibers will be used.

Preferred film formers for use in the size composition include epoxy resin emulsions that contain a low molecular weight epoxy resin and at least one surfactant. It is preferred that the epoxy resin have a molecular weight of from 350 to 450 and an epoxy equivalent weight of from 175 to 225, and even more preferably a molecular weight of from 350 to 380 and an epoxy equivalent weight of from 175-190. "Epoxy equivalent weight", as used herein is defined by the molecular weight of the epoxy resin divided by the number of epoxy groups present in the compound. Useful epoxy resins contain at least one epoxy or oxirane group in the molecule, such as polyglycidyl ethers of polyhydric alcohols or thiols. Examples of suitable epoxy film forming resins include Epon® 825 and Epon® 826, which are commercially available from Resolution, DER 330 and DER 331, which are commercially available from Dow Chemical, and YD 127 and YD 128, which are commercially available from Epotec.

The low molecular weight epoxy resin emulsions are in a liquid form which reduces, and in some cases, eliminates the need for a solvent such as diacetone alcohol. This reduction of organic solvents in turn reduces the amount of VOC's (volatile organic compounds) that are emitted into the working environment. In addition, the low molecular weight epoxy film forming emulsions according to the present invention are substantially color free. As used herein, the term "substantially color free" means that there is minimal or no coloration of the epoxy emulsions. Another advantage of the inventive epoxy emulsions is that they disperse easily in water.

Examples of suitable surfactants for use in the epoxy resin emulsion include, but are not limited to, Triton X-100, an octylphenoxypolyethoxyethanol (available from Union Carbide Corp.), Pluronic P103, an ethylene oxide/propylene oxide block copolymer (available from BASF), Pluronic F77, an ethylene oxide/propylene oxide block copolymer (available from BASF), Pluronic 10R5, an ethylene oxide/propylene oxide block copolymer (available from BASF), a block copolymer of ethylene oxide and propylene oxide such as Pluronic L101 (available from BASF) or Synperonic PE L101 (available from ICI), a polyoxyethylene-polyoxypropylene block copolymer such as Pluronic P105 (available from BASF), and an ethylene oxide/propylene oxide copolymer (available from BASF). Preferably, the epoxy resin emulsion contains two or more surfactants. In a preferred embodiment, a combination of Pluronic L101 and Pluronic P105 is used in the epoxy resin emulsion. The surfactant or surfactants may be present in the epoxy resin emulsion in all amount of from 10-25%, and most preferably 18%.

The epoxy resin emulsion is present in the size composition in an amount of from about 50 to about 95%, and even more preferably, in an amount of from about 60 to about 90% by weight solids.

A comparison of a conventional epoxy resin emulsion and inventive film forming epoxy resin emulsions is set forth in Table 1.

TABLE 1

| Film Former | Status | Base Epoxy | Epoxy Equivalent Weight | Pluronic surfactant | Physical State | Solvent Present |
|---|---|---|---|---|---|---|
| AD-502 | Conventional | DER 337 | 230-250 | 18% | Semi-solid | Yes |
| RSW-3822 | Inventive | Epon 826 | 178-186 | 18% | Liquid | No |
| RSW-3860 | Inventive | Epon 826 | 178-186 | 12% | Liquid | No |
| RSW-3861 | Inventive | Epon 825 | 175-180 | 18% | Liquid, highly crystallizable | No |

The coupling agents used in the size composition may have hydrolyzable groups that can react with the glass surface to remove unwanted hydroxyl groups and one or more groups that can react with the film-forming polymer to chemically link the polymer with the glass surface. In particular, the coupling agent preferably includes 1-3 hydrolyzable functional groups that can interact with the surface of the glass fibers and one or more organic groups that are compatible with the polymer matrix.

A suitable coupling agent for use in the sizing composition is an organosilane that has a readily hydrolyzable bond to a silicon atom of the silane, or hydrolysis products thereof. Silane coupling agents which may be used in the present size composition may be characterized by the functional groups amino, epoxy, azido, vinyl, methacryloxy, ureido, and isocyanato. Preferably, the organosilane has an epoxy group linked though non-hydrolyzable bonds to a silicon atom. In addition, the organosilane may include an acrylyl or methacrylyl group linked through non-hydrolyzable bonds to a silicon atom of the silane.

Organosilanes for use in the size composition include monosilanes containing the stricture $Si(OR)_2$, where R is an organic group such as an alkyl group. Lower alkyl groups such as methyl, ethyl, and isopropyl are preferred. Silane coupling agents function to enhance the adhesion of the film forming agent to the glass fibers and to reduce the level of fuzz, or broken fiber filaments, during subsequent processing. Examples of suitable coupling agents for use in the invention include, but are not limited to, a glycidoxy polymethylenetrialkoxysilane such as 3-glycidoxy-1-propyl-trimethoxysilane, an acryloxy or methacrylyloxypolymethylenetrialkcoysilane such as 3-methacrylyloxy-1-propyltrimethoxysilane, γ-glycidoxypropyltrimethoxysilane (A-187 from GE Silicones), γ-methacryloxypropyltrimethoxysilane (A-174 from GE Silicones), aminopropyltriethoxysilane (A-1100 from GE Silicones), γ-aminopropyltrimethoxysilane (A-1110 from GE Silicones), N-β-aminoethyl-γ-aminopropyltrimethoxysilane (A-120 from GE Silicones), N-phenyl-γ-aminopropyltrimethoxysilane (Y-9669 from GE Silicones), α-chloropropyltrimethoxysilane (KBM-703 from Shin-Etsu Chemical Co., Ltd.), α-glycidoxypropylmethyldiethoxysilane (A-2287 from GE Silicones), vinyl-tris-(2-methoxyethoxy)silane (A-172 from GE Silicones), and bis-γ-trimethoxysilylpropylamine (A-1170 from GE Silicones). Although the size composition may contain one or more coupling agents, the size composition preferably contains at least one epoxy silane such as γ-glycidoxypropyltrimethioxysilane (A-187 from GE Silicones). The coupling agent or agents may be present in the sizing C composition in an amount of from about 1 to about 15%, and more preferably in an amount of from about 5 to about 12% by weight solids.

The sizing composition also contains at least one cationic lubricant to aid in the reduction of interfilament abrasion. Suitable examples of cationic lubricants include, but are not limited to, a polyethyleneimine polyamide salt commercially available from Cognis under the trade name Emery 6760L, a stearic ethanolamide such as Lubesize K-12 (Alpha/Owens Corning)), Cirrasol 185AE (Unichemie), and Cirrasol 185AN (Unichemie). The amount of cationic lubricant present in the size composition is preferably an amount sufficient to provide a level of the active lubricant that will form a coating with low fuzz development. The cationic lubricant may be present in the sizing composition in an amount up to about 15% by weight solids, but is preferably present in an amount of from about 0.01 to about 2.0% by weight solids, and more preferably present in an amount of from about 0.25 to about 1.25% by weight solids.

In addition to a cationic lubricant, the sizing composition may also contain at least one non-ionic lubricant. The non-ionic lubricant in the sizing composition acts as a "wet lubricant" and provides additional protection to the fibers during the filament winding process. In addition, the non-ionic lubricant helps to reduce the occurrence of fuzz. A non-exclusive example of a suitable non-ionic lubricant is a polyalkylene glycol fatty acid such as PEG 600 Monostearate (a polyethylene glycol monostearate available from Cognis). Other non-limiting examples include PEG 400 Monostearate (Cognis), PEG 400 Monooleate (Cognis), and PEG 600 Monolaurate (Cognis). The non-ionic lubricant may be present in the size composition in an amount from 0-20% by weight solids.

In addition, the size composition may optionally contain an antistatic agent. Antistatic agents especially suitable for use herein include antistatic agents that are soluble in the sizing composition. Examples of suitable antistatic agents include compounds such as Emerstat™ 6660A and Emerstat™ 6665 (quaternary ammonium antistatic agents available from Emery Industries, Inc.), teteraethylammonium chloride, and lithium chloride. The antistatic agent may be included in the size composition in an amount of from about 0 to about 5.0% by weight solids, and preferably in an amount of from about 0.25 to about 3.0% by weight solids.

Further, the sizing composition may contain a small amount of a weak acid. Although not wishing to be bound by theory, it is believed that citric acid, a conventional acid additive for sizing compositions used to adjust the pH, may prematurely open the epoxy groups in the film formers and epoxy silanes if used in large amounts during the drying of the glass fibers, which may result in a reduction of mechanical properties. In the inventive size composition, a trace amount of acetic acid, formic acid, succinic acid, citric acid, boric acid, and/or metaboric acid may be added to the inventive sizing composition to hydrolyze the silane in the coupling agent without prematurely opening the epoxy groups. In preferred embodiments, a trace amount of acetic acid and/or boric acid is included in the size composition. The amount of acid included in the size composition is desirably an amount sufficient to impart a pH of from 3.0-7.0, and more preferably a pH of from 3.5-5.5.

As an alternative to the addition of a weak acid, the sizing, composition may contain a mixture of a weak acid such as acetic acid, formic acid, citric acid, or succinic acid and a borate salt. It is preferred that the weak acid is acetic acid. In this alternative embodiment, the boron concentration in the size preferably ranges from about 0.1 to about 3.0% of the sizing composition. Examples of suitable borate salts include, but are not limited to, boron oxide, sodium tetraborate, potassium metaborate, potassium tetraborate, ammonium biborate, ammonium tetrafluoroborate, butylammonium tetrafluoroborate, calcium tetrafluoroborate, lithium fluoroborate, potassium tetrafluoroborate, sodium tetrafluoroborate, tetrabutylammonium tetrafluoroborate, tetraethylammonium tetrafluoroborate, and zinc tetrafluoroborate.

Optionally, the size composition may contain a polyurethane film former such as Baybond 2297 (Bayer), Baybond PU403 (Bayer), and W-290H (Crompton) or an epoxy/polyurethane film former such as Epi-Rez 5520-W-60 (Resolution). Although not wishing to be bound by theory, it is believed that the polyurethane film former increases strand integrity and the mechanical fatigue performance by toughening the resin/size interphase. The toughened resin interphase results in a final composite product that has an improved resistance to cracking and has increased or improved mechanical properties such as improved strength. The polyurethane film former may be present in the sizing composition an amount of from about 0 to about 30% by weight solids.

The size composition further includes water to dissolve or disperse the active solids for coating. Water may be added in an amount sufficient to dilute the aqueous sizing composition to a viscosity that is suitable for its application to glass fibers and to achieve the desired solids content. The sizing composition may contain Up to approximately 97% water.

The sizing composition of the present invention may optionally contain conventional additives Such as dyes, oils, Fillers, thermal stabilizers, biocides, anti-foaming agents, anti-oxidants, organosilanes, dust suppressing agents, vetting agents, and/or other conventional additives. The amount of additives present in the size composition is preferably not in excess of approximately 10% of the total weight of the size.

The range of components contemplated for use in the sizing composition is set forth in Table 2.

TABLE 2

| Sizing Component | % by Weight Solids |
| --- | --- |
| Epoxy Resin Emulsion | 50-95 |
| Polyurethane Film Former | 0-30 |
| Coupling Agent | 1-15 |

TABLE 2-continued

| Sizing Component | % by Weight Solids |
| --- | --- |
| Acid | 0.01-5 |
| Cationic Lubricant | 0.01-15 |
| Non-Ionic Lubricant | 0-20 |
| Antistatic agent | 0-5 |
| Water | balance |

A preferred aqueous sizing composition according to the present invention is set forth in Table 3.

TABLE 3

| Sizing Component | % by Weight Solids |
| --- | --- |
| Epoxy Film Former | 60-90 |
| Polyurethane Film Former | 0-20 |
| Epoxy Silane Coupling Agent | 8-12 |
| Aminosilane Coupling Agent | 0.25-3.0 |
| Boric Acid | 0.25-1.0 |
| Acetic Acid | 0.05-0.1 |
| Cationic Lubricant | 0.25-1.0 |
| Non-Ionic Lubricant | 0-5.0 |
| Antistatic agent | 0.25-1.25 |
| Water | balance |

Another preferred aqueous sizing composition according to the present invention is set forth in Table 4.

TABLE 4

| Sizing Component | % by Weight Solids |
| --- | --- |
| Epoxy Film Former | 80-90 |
| Epoxy/polyurethane Film Former | 0-5 |
| Epoxy Silane Coupling Agent | 8-12 |
| Aminosilane Coupling Agent | 0.25-3 |
| Boric Acid | 0.25-5 |
| Cationic Lubricant | 0.25-1.0 |
| Non-Ionic Lubricant | 0-5.0 |
| Antistatic agent | 0.25-1.25 |
| Water | balance |

The size composition may be made by first admixing the coupling agent, the acid or acid borate mixture, and the epoxy resin film forming emulsion with agitation to form a main mixture. If necessary, the main mixture is adjusted to a desired pH level of approximately 3.5-7.0. The cationic lubricant and the antistatic agent (if present) may be separately admixed and added to the main mixture. In addition, the polyurethane or epoxy/polyurethane (if present) and the non-ionic lubricant (if present) may be added to the main mixture. Water is then added in an amount to achieve the appropriate concentration and control the mix of solids.

The size composition may be applied to strands of glass formed by conventional techniques such as by drawing molten glass through a heated bushing to form substantially continuous glass fibers. Any type of glass, Such as A-type glass, C-type glass, E-type glass, S-type glass, or modifications thereof, is suitable for use as the fiber material. For example, in one modifications of E-type glass, the boron oxide is replaced by magnesium oxide. Such a glass is commercially available from Owens Coring Fiberglass Corporation under the trade name Advantex®. Alternatively, the sizing composition may be applied to strands of one or more synthetic polymers such as polyester, polyamide, aramid, and mixtures thereof. The polymer strands may be used alone as the reinforcing fiber material, or they may be used in combination with glass strands such as those described above. Carbon fibers may be also used.

The size composition may be applied to fibers having a diameter of from about 4 to about 30 microns, with fibers of from about 12 to about 23 microns in diameter being more preferred. The mix solids content of the size may be from about 1 to about 15%, preferably from about 3 to about 8%, and most preferably from about 5.3 to about 5.8%. Further, the size is preferably applied to the fibers and dried such that the size is present on the fibers in an amount of from about 0.3 to about 1.25 percent by weight based on the total weight of the fibers. This can be determined by the loss on ignition (LOI) of the fiber rovings, which is the reduction in weight experienced by the fibers after heating them to a temperature sufficient to burn or pyrolyze the organic size from the fibers. To achieve the desired solids content on the fibers, the amount of water added to dilute the size mixture may be varied. In addition, the size composition may be applied to single or multi-filament fiber strands. Each strand may contain from approximately 2000-4000 fibers.

The sizing composition may be applied to the fibers in ally conventional manner using any conventional application such as by spraying or drawing the Fibers to be sized across a rotating or stationary roll vet with the sizing composition. The size composition is preferably applied to the Fibers in an amount sufficient to provide the fibers with a moisture content of from about 5% by weight to about 15% by weight.

The sizing composition is advantageously employed to coat (size) the fibers used in a filament winding application. For example, the fibers may be coated with the sizing composition and formed into a roving in a conventional manner. The sized roving may then be wound onto a mandrel. The mandrel may be any conventional mandrel such as a reusable mandrel, a collapsible mandrel, an integral mandrel, or a sacrificial mandrel. Once the roving has been wound about the mandrel, the composite part and mandrel are heated, such as by passing the composite part/mandrel through an oven or by passing hot air through the part. Once the composite is cured and cooled, the mandrel is removed. Composite parts such as pipes or tanks made from fibers sized with the size composition demonstrate superior strength and superior processing characteristics such as faster impregnation of the strand with the epoxy resin, a low level of broken filaments, and a smoother surface of the pipe.

Having generally described this invention, a further understanding can be obtained by reference to certain specific examples illustrated below which are provided for purposes of illustration only and are not intended to be all inclusive or limiting unless otherwise specified.

EXAMPLES

Example 1

Preparation of a Sizing Composition 17,000 g of the size composition set forth in Table 5 having a solids content of from 4-8% is made by adding 6-9 grams of A-1100 silane to approximately 4,000 grams of deionized water with stirring in a clean 5 gallon pail or bucket fitted with a motorized stirrer that turns at a slow speed. 10-13 grams of glacial acetic acid is then added to the bucket and the resulting mixture is permitted to stir for a few minutes. The pH is determined, Such as by using a pH meter or pH paper, to be between 3.5 and 7.0. 4-7 grams of boric acid is then added and the stifling is continued. 130-170 grams of A-187 silane is weighed and added to the mixture in the bucket. The mixture is permitted to stir for about 5 minutes. 1350-1500 grams of RSW-3861 is then added to form a main mixture.

A premix of about 500 grams of deionized water, 8-12 grams of Emery 6760L, and 9-14 grams of Emerstat™ 6660A is made in a beaker. The premix is stirred, such as with a tongue depressor, and added to the main mixture. The main mixture is then stirred for 5 more minutes. A 1.0-2.0 gram sample of the main mixture is drawn from the bucket to determine the mix solids. The mix solids number is determined and a simple calculation is done to determine the amount of water needed to be added to achieve a final mix solids of from 4-8%.

TABLE 5

| Sizing Component | Weight (g) |
|---|---|
| A-1100 | 6-9 |
| A-187 | 130-170 |
| Acetic Acid | 8-13 |
| Boric Acid | 4-7 |
| RSW-3861 | 1350-1500 |
| Emery 6760L | 8-12 |
| Emerstat ™ 6660A | 9-14 |
| Water | balance |

Example 2

Effect on Pipe Axial Tensile Strength

Glass fibers sized with sizing compositions A and B (shown in Table 6) were each helically wound about a mandrel and cured to form amine cured epoxy pipes. Pipes were also made using Control A and Control B, which are current commercial epoxy compatible products for filament winding that are commercially available from Owens Corning, and Competitor A and Competitor B, two competitive epoxy compatible products for filament winding. The control and competitor products used sizing chemistries for epoxy filament winding that included silane coupling agents, epoxy film formers, and various lubricants.

TABLE 6

| Sizing Component | Sizing Composition A (%) | Sizing Composition B (%) |
|---|---|---|
| RSW-3861[1] | 87.36 | 86.86 |
| A-187[2] | 11.04 | 11.04 |
| A-1100[3] | 0.50 | 0.50 |
| Acetic Acid (100%) | 0.10 | 0.10 |
| Emery 6760L[4] (100%) | 0.50 | 0.50 |
| Emerstat 6660A[5] | 0.50 | 0.50 |
| Boric Acid(100%) | 0.0 | 0.50 |
| Total | 100.0 | 100.0 |

[1] Epon 825 + 18% P105/L101
[2] γ-glycidoxypropyltrimethoxysilane (GE Silicones)
[3] aminopropyltriethoxysilane (GE Silicones)
[4] a polyethyleneimine polyamide salt (Cognis)
[5] quaternary ammonium antistatic agent (Emery Industries, Inc.)

The pipes made and used in this experiment were 12 foot long pipes that had an inside diameter of 2.235 inches and a wall thickness of about 0.060 inches. The pipes were made on a Mclean-Anderson filament winding machine using a filament winding process in which glass rovings sized with the appropriate sizing compositions were dipped into a resin bath, excess resin was removed by squeegees, and the wetted roving was wound onto the pipe at a 54.75 degree angle. The completed (wound) pipe and mandrel were transferred to a pipe curing oven to chemically crosslink the epoxy matrix to form the finished pipe. After cooling, the pipe was removed from the mandrel and cut into four sections. Some of the pipe was cut into longitudinal sections for axial tensile strength measurements and other sections of the pipe were used for pipe cyclic fatigue testing.

The portions of the pipe used for axial tensile strength measurements were cut longitudinally into test strips about 0.5 in wide and about 10 inches long. The strips were tested for axial tensile strength according to the method disclosed in ASTM D2105 except that the longitudinal test strips were tested instead of a whole pipe. The samples were broken using an Instron testing machine. Some of the samples were tested dry and other samples were immersed in boiling water for 7 days and then tested. The results are shown in Table 7.

TABLE 7

| Roving Product | Axial Tensile, Dry, ksi | Axial Tensile, 7 day boil, ksi | % strength retention |
|---|---|---|---|
| Sizing A (with boric acid) | 9.41 | 7.49 | 80 |
| Sizing B (without boric acid) | 9.62 | 6.02 | 63 |
| Control A | 9.25 | 5.78 | 62 |
| Control B | 8.78 | 5.42 | 62 |
| Competitor A | 9.29 | 6.42 | 69 |
| Competitor B | 9.45 | 5.58 | 59 |

As shown in Table 7, Sizing Composition A, the inventive size composition that contained boric acid, demonstrated a higher percent strength retention after a 7 day boil. The data in Table 7 also shows that Sizing Composition A has outstanding wet strength properties compared to the control products and the competitor products due to the high percent strength retention of Sizing Composition A. Therefore, the pipe formed from Sizing Composition A had improved wet mechanical properties over the current state of the art. Although not wishing to be bound by theory, it is believed that the presence of boric acid may be the factor that improved the wet properties.

Example 3

Effect on Pipe Axial Tensile Strength

An amine cured epoxy pipe containing fibers sized with Sizing Composition A (shown in Table 6) was made in the same manner as described in Example 2 above. Pipes were also formed in the same manner using the epoxy compatible products Control A and Competitor A. The formed pipes were cut longitudinally into test strips about 0.5 in wide and about 10 inches long. The strips were tested for pipe axial strength in the same manlier as in Example 2. The results are shown in Table 8.

TABLE 8

| Roving Product | Axial Tensile, Dry, ksi | Axial Tensile, 7 day boil, ksi | % strength retention |
|---|---|---|---|
| New Sizing A (with boric acid) | 9.79 | 7.23 | 74 |
| Control A | 9.19 | 6.01 | 65 |
| Competitor A | 9.16 | 6.21 | 68 |

This example further illustrates the high percent of strength retained by the pipe made from fibers sized with Sizing Composition A after a seven day boil. The wet tensile strength is a better indicator of the quality of the composite pipe as compared to the dry strength. The ability of a sizing composition to resist water degradation is a desired property if the composite pipe is to have long term performance. Long term performance of composite pipe under high temperature and pressure under wet conditions is measured by pipe manufacturers. It is believed that very high wet strength performance may be related to better long term performance.

Example 4

Effect of Pipe Cyclic Fatigue

Glass fibers sized with Sizing Composition A (shown in Table 6) were tested for pipe cyclic fatigue in both an amine cured and an anhydride cured epoxy pipe. The test was conducted according to ASTM D2992, part A. The test was conducted three times in the amine cured epoxy pipe and once in the anhydride cured epoxy pipe. The pipes were made in the same manner as described above in Example 2. A detailed description of the experimental procedure is set forth below.

In this example, a section of pipe approximately 30 inches long was installed with end fittings that had a port to accept water under high pressure. The pipe was filled with water and subjected to a cyclic test where the interior of the pipe was pressurized then depressurized. The cycle testing rate was about 25 cycles per minute. As the test progressed, cracks appeared in the pipe due to the applied pressure. These cracks are typically one of three types: resin matrix cracking, cracking clue to de-bonding between the glass matrix interface, and de-bonding between layers of helically wound glass and resin. Over time, water penetrated the cracks in the pipe to the surface of the pipe. The penetration of the water through the pipe wall was termed a leak or a pipe failure. Leaks were electronically detected by completing an electrical circuit that was set up by wrapping the pipe with a conductive metal foil. When a leak was detected, the counter was stopped and the number of cycles were recorded. The pipe was then taken apart and the wall thickness of the pipe was measured.

The data obtained from the cyclic testing was plotted and fitted to a line using linear regression. The logarithm of the hoop stress was plotted against the logarithm of the cycles. The samples were then compared by selecting a hoop stress and determining the corresponding number of cycles. The higher the number of cycles conducted, the higher the performance. The results are shown in Table 9.

TABLE 9

| Roving Product | Test 1 Amine Cured Pipe, Cycles at 24,361 psi Hoop Stress | Test 2 Amine Cured Pipe, Cycles at 25,539 psi Hoop Stress | Test 3 Amine Cured Pipe, Cycles at 25,852 psi Hoop Stress | Test 4 Anhydride Cured Pipe, Cycles at 30,054 psi Hoop Stress |
|---|---|---|---|---|
| Sizing A (with boric acid) | 1172 | 685 | 624 | 1030 |

TABLE 9-continued

| Roving Product | Test 1 Amine Cured Pipe, Cycles at 24,361 psi Hoop Stress | Test 2 Amine Cured Pipe, Cycles at 25,539 psi Hoop Stress | Test 3 Amine Cured Pipe, Cycles at 25,852 psi Hoop Stress | Test 4 Anhydride Cured Pipe, Cycles at 30,054 psi Hoop Stress |
|---|---|---|---|---|
| Control A | 192 | 558 | 623 | |
| Control B | | | 200 | 605 |
| Competitor A | 589 | | | 315 |

Table 9 shows that pipes made with glass fibers sized with Sizing Composition A had improved pipe cyclic fatigue compared to pipes made with the control and competitor sizing compositions. Improving pipe cyclic fatigue can allow a pipe manufacturer to reduce the thickness of the pipe wall and maintain the same level of leak resistance. The thinner wall may result in a reduction in the pipe's overall weight and a reduction in materials used to form the pipe, which may result in a reduction in manufacturing costs.

Example 5

Effect of Cyclic Fatigue

Glass fibers sized with Sizing Composition M (shown in Table 10) and Control A, a current commercial epoxy compatible product for filament winding available from Owens Corning, were each helically wound about a mandrel and cured to form amine cured epoxy pipes. The control product used sizing chemistries for epoxy filament winding that included silane coupling agents, epoxy film formers, and various lubricants, but no polyurethane film former.

TABLE 10

| Components | Sizing Composition M (%) |
|---|---|
| RSW-3822[1] | 62.5 |
| Baybond 2297[2] | 20.4 |
| A-187[3] | 11.0 |
| Acetic Acid (100%) | 0.1 |
| PEG 600 MS[4] | 5.0 |
| Emery 6760L[5] | 0.5 |
| Emersat 6660A[6] | 0.5 |
| Total | 100 |

[1]Epon ® 826 + 18% P105/L101
[2]polyurethane film former (Bayer)
[3]γ-glycidoxypropyltrimethoxysilane (GE Silicones)
[4]a polyethylene glycol monostearate (Cognis)
[5]a polyethyleneimine polyamide salt (Cognis)
[6]quaternary ammonium antistatic agent (Emery Industries, Inc.)

The pipes were then tested for pipe cyclic fatigue according to ASTM D2992, part A. The samples were compared by selecting a hoop stress and determining the corresponding number of cycles. The results are set forth in Table 11.

TABLE 11

| Roving Product | Amine Cured Pipe, Cycles at 25,021 psi Hoop Stress |
|---|---|
| Sizing M (with polyurethane film former) | 962 |
| Control A | 450 |

Table 11 shows that pipes made with glass fibers sized with Sizing M, a size that included a polyurethane film former, had an improved pipe cyclic fatigue compared to pipes made with the control sizing composition. Although not wishing to be bound by theory, it is believed that the presence of a polyurethane film former in the size composition may be the factor that improved the cyclic performance, and thus improved the mechanical strength, of the pipes sized with Sizing Composition M.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. An aqueous sizing composition comprising:
   an epoxy resin emulsion containing an epoxy resin having an epoxy equivalent weight from 175-190 and at least one surfactant;
   one or more organosilane coupling agents containing the structure $Si(OR)_2$, where R is an organic group;
   a cationic lubricant;
   boric acid; and
   at least one weak acid.

2. The sizing composition of claim 1, wherein said acid is one or more acids selected from the group consisting of acetic acid, boric acid, metaboric acid, succinic acid, citric acid and formic acid.

3. The sizing composition of claim 1, further comprising a member selected from the group consisting of a polyurethane film former and an epoxy/polyurethane film former.

4. The sizing composition of claim 1, wherein said organosilane coupling agent comprises an epoxy silane coupling agent.

5. The sizing composition of claim 1, wherein said epoxy resin emulsion is present in said sizing composition in an amount of from about 60 to about 90% by weight solids, said coupling agent is present in said sizing composition in an amount of from about 1 to about 15% by weight solids, said cationic lubricant is present in said sizing composition in an amount of from about 0.01 to about 2.0% by weight solids, and said acid is present in said sizing composition in an amount of from about 0.01 to about 5.0% by weight solids.

6. The sizing composition of claim 1, wherein said epoxy resin emulsion includes two or more surfactants.

7. The sizing composition of claim 1, wherein said acid is present in said sizing composition in an amount sufficient to impart a pH from 3.0-7.0.

8. The sizing composition of claim 1, wherein said at least one surfactant is present in said epoxy resin emulsion in an amount from 10-25%.

9. An aqueous sizing composition consisting of:
an epoxy resin emulsion containing an epoxy resin having an epoxy equivalent weight from 175-225 and at least one surfactant;
one or more organosilane coupling agents containing the structure Si(OR)$_2$, where R is an organic group;
a cationic lubricant; and
at least one acid.

10. The sizing composition of claim 9, wherein said one or more organosilane coupling agents is an epoxy silane coupling agent.

11. The sizing composition of claim 9, wherein said one or more organosilane coupling agents are an epoxy silane coupling agent and an aminosilane coupling agent.

12. The sizing composition of claim 9, wherein said acid is one or more acids selected from the group consisting of acetic acid, boric acid, metaborie acid, succinic acid, citric acid and formic acid.

13. The sizing composition of claim 9, wherein said epoxy resin emulsion is present in said sizing composition in an amount from 60-90% by weight solids, said one or more organosilane coupling agents is present in said sizing composition in an amount from 1-15% by weight solids, said cationic lubricant is present in said sizing composition in an amount from 0.01-2.0% by weight solids, and said acid is present in said sizing composition in an amount from 0.01-5.0% by weight solids.

14. The sizing composition of claim 9, wherein said epoxy resin contains an oxirane group.

15. An aqueous sizing composition comprising:
an epoxy resin emulsion containing an epoxy resin having an epoxy equivalent weight from 175-190 and at least one surfactant;
an epoxy polyurethane film former;
one or more organosilane coupling agents;
a cationic lubricant; and
at least one acid.

16. The sizing composition of claim 15, wherein said one or more organosilane coupling agents is an epoxy silane coupling agent.

17. The sizing composition of claim 15, wherein said one or more organosilane coupling agents are an epoxy silane coupling agent and an aminosilane coupling agent.

18. The sizing composition of claim 15, wherein said acid is one or more acids selected from the group consisting of acetic acid, boric acid, metaboric acid, succinic acid, citric acid and formic acid.

19. The sizing composition of claim 15, wherein said epoxy resin emulsion is present in said sizing composition in an amount from 60-90% by weight solids, said film former is present in said sizing composition in an amount tip to 30% by weight solids, said one or more organosilane coupling agents is present in said sizing composition in an amount from 1-15% by weight solids, said cationic lubricant is present in said sizing composition in an amount from 0.01-2.0% by weight solids, and said acid is present in said sizing composition in an amount from 0.01-5.0% by weight solids.

20. The sizing composition of claim 15, wherein said epoxy resin contains an oxirane group.

21. The sizing composition of claim 15, wherein said one or more organosilane coupling agents includes from 1 to 3 hydrolyzable functional groups.

22. The sizing composition of claim 15, wherein said epoxy resin is a liquid epoxy resin.

23. The sizing composition of claim 15, further comprising at least one member selected from a non-ionic lubricant and an antistatic agent.

24. The sizing composition of claim 15, wherein said epoxy resin emulsion includes two or more surfactants.

25. The sizing composition of claim 15, wherein said at least one surfactant is present in said epoxy resin emulsion in an amount from 10-25%.

26. The sizing composition of claim 15, wherein said acid is present in said sizing composition in an amount sufficient to impart a pH from 3.0-7.0.

27. The sizing composition of claim 15, further comprising a borate salt.

28. The sizing composition of claim 27, wherein said borate salt is selected from the group consisting of boron oxide, sodium tetraborate, potassium metaborate, potassium tetraborate, ammonium biborate, ammonium tetrafluoroborate, butylammonium tetrafluoroborate, calcium tetratluoroborate, lithium fluoroborate, potassium tetrafluoroborate, sodium tetrafluoroborate, tetrabutylammonium tetrafluoroborate, tetraethylaminonium tetrafluoroborate and zinc tetrafluoroborate.

* * * * *